UNITED STATES PATENT OFFICE.

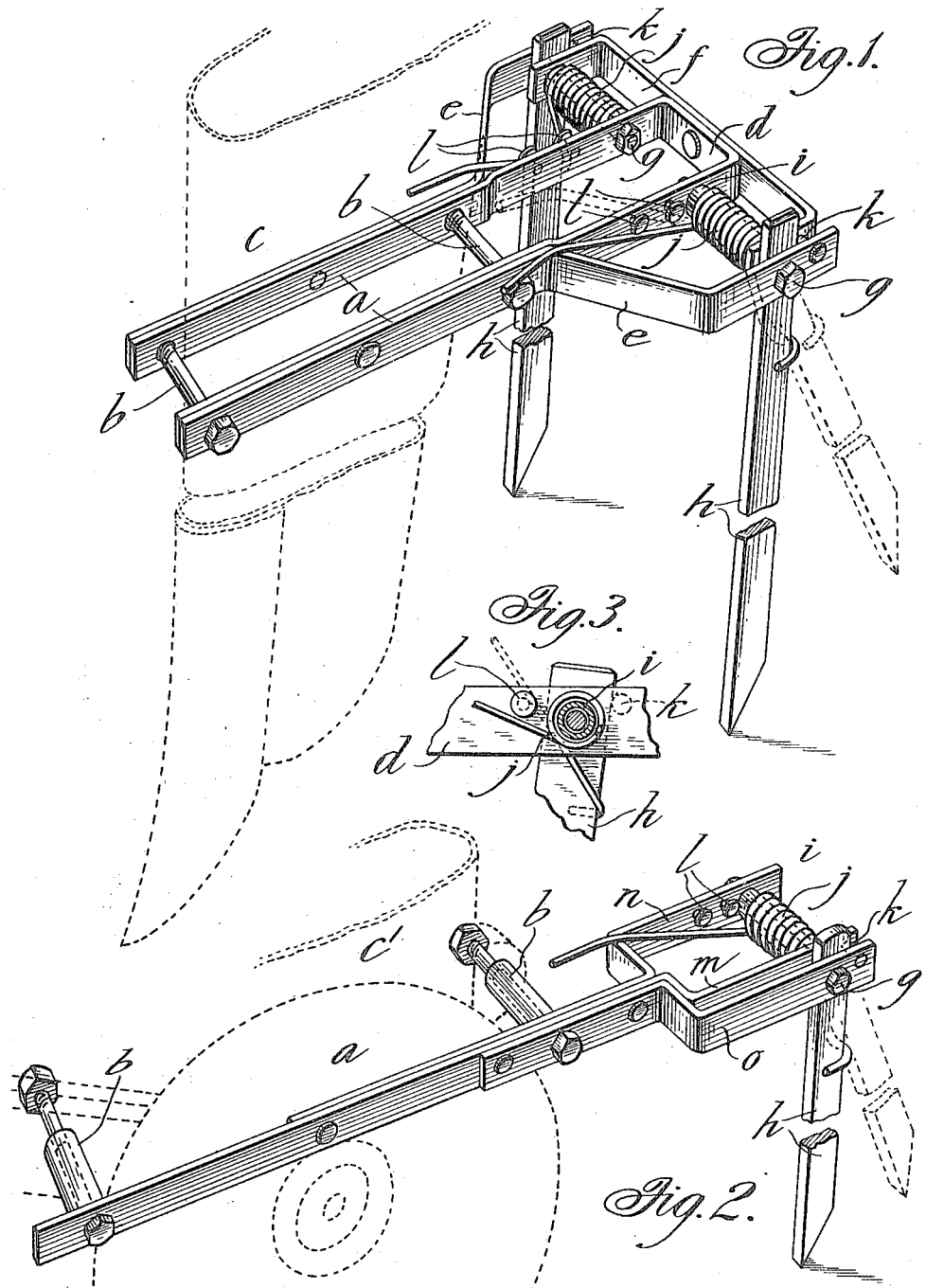

RICHARD ALBERT MINTERN, OF HORSHAM, VICTORIA, AUSTRALIA.

COVERER ATTACHMENT FOR PLANTERS.

1,202,562.  Specification of Letters Patent.  Patented Oct. 24, 1916.

Application filed February 10, 1915. Serial No. 7,345.

*To all whom it may concern:*

Be it known that I, RICHARD ALBERT MINTERN, of Horsham, in the State of Victoria, Commonwealth of Australia, have invented certain new and useful Improvements in Coverer Attachments for Planters, of which the following is a specification.

This invention relates to an improved attachment for the hoes or disks of seed and fertilizer drills, and has been devised in order to make provision for a thoroughly effective covering of the seed and manure when the same is deposited in the furrows formed by the tilling members of the machine. The said attachment, furthermore, enables the abovementioned object to be effected without interfering with the seed and manure when sown which is a result essential to secure a maximum growth of crop.

The invention broadly consists in mounting brackets adjustably or otherwise to the shoes or boots carrying the hoes or disks and in pivotally supporting tines at the rear of said brackets whereby they will pass through and spread the ridges formed between the paths of the hoes or disks in a lateral direction and so fill in the furrows or "drills" formed by the same. The said tines are retained in their normal working positions by coil springs and the strength of the said springs can be adjusted to exert a greater or lesser forward pressure on the working ends of the tines.

The lastmentioned feature of construction enables the appliance to automatically adjust itself to the inequalities of the ground and to jump obstacles firmly embodied therein, while another feature of its construction is its adaptability to scarifiers or implements of a like nature.

In order that the invention may be readily understood reference will now be had to the accompanying sheet of explanatory drawings, wherein:—

Figure 1 is a view in perspective showing that form of the improved attachment which is adaptable for drills fitted with hose, and Fig. 2 is a similar view showing that form of the attachment which is adaptable for drills fitted with disks. Fig. 3 is a view in sectional elevation of a constructional detail hereinafter fully described.

In these drawings the letter $a$ designates a bracket which is secured by bolts $b$ or is otherwise clamped to the upper part of a shoe or boot $c$ and $c^1$ respectively. That form of the bracket which is shown in Fig. 1 comprises a central U-shaped part $d$, outwardly and rearwardly bent parts $e$ and a cross-piece $f$. The side parts $e$ lie against and parallel with the forward part of the U-shaped part $d$ to a point a little behind the shoe $c$ whence they are bent outwardly and then rearwardly so that their ends are in line with the cross piece $f$. The ends of the cross-piece $f$ are bent forwardly at right angles and bolts $g$ are passed through holes formed therein and through holes formed in the rear ends of the side parts $e$ and in the U-shaped part $d$. A pin or stud can be employed in lieu of a bolt to pivotally support the tines and the said pin or stud can be arranged in any preferred way. The said bolts $g$ also pass through holes formed in tines $h$ the upper ends of which are located between the rear ends of the side parts $e$ and the forwardly bent portions of the cross-piece $f$. Those parts of the bolts $g$ that lie between the forwardly bent parts of the cross-piece $f$ and the U-shaped part $d$ of the bracket can be covered by sleeves $i$ over which are placed coil springs $j$. One end of each of the said springs $j$ is extended and shaped to bear on the back of the adjacent tine $h$. The opposite ends of the springs are arranged to project forwardly and normally rest upon the outwardly bent portions of the side parts $e$ of the bracket.

The tension on the springs $j$ tends to exert a forward pressure on the lower ends of the tines and their upper ends in contact with abutments $k$ formed on the rear ends of the side parts $e$ of the bracket. The said abutments $k$ prevent the tines being moved forward beyond their normal working position and are so arranged that they do not prevent the tines being moved back to or approximately to the horizontal.

When it is desired to increase the tension of the springs $j$ the forwardly projecting ends thereof can be lifted and placed above studs $l$ fitted to the brackets, as shown by dotted lines in Figs. 1 and 3 of the drawings. Two or more of these studs $l$ can be provided and when the tension of the springs is increased by raising and pulling the forward ends of the springs rearwardly and holding them in position a greater resistance must be placed on the lower ends of the tines before they will move to the rear.

The forward part of the bracket $c$ can be made in a variety of ways and it can be secured to a shoe or boot in diverse ways.

It will be obvious that when the bracket *a* is constructed as shown in Fig. 1 only each alternate shoe need be fitted with the attachment but if preferred each shoe can be fitted with a tine in which case the brackets would be made one sided.

That form of the invention which is adaptable to drills fitted with disks is shown in Fig. 2 of the drawings and comprises three flat bars which are secured by bolts *b* or otherwise suitably clamped to the boot *c¹*. The central bar *m* is bent outwardly and rearwardly at its rear end and on opposite sides thereof are secured similarly bent bars *n* and *o*.

The rear end of the bar *n* is located at a greater distance from the bar *m* than the bar *o* and passing through holes formed in the rear ends of the three bars is a bolt *g*. The bolt *g* also passes through a hole formed in the upper end of a tine *h* which is located between the bars *m* and *o* and bears against an abutment *k* fitted to one of the bars.

A sleeve *i* fits over that part of the bolt lying between the bars *m* and *n* and on the said sleeve is mounted a coil spring *j* similar to those hereinbefore described.

Studs *l* are fitted to or formed on the bar *n* to provide means for adjusting the tension of the spring *j* as and for the purpose before described.

In the foregoing specification I have described and in the drawings I have illustrated a simple and economically constructed bracket for supporting the tines and springs but it will be obvious that the said brackets can be formed in a variety of different ways that will be equally efficient in practice and therefore I do not wish to be understood as limiting myself to the precise construction herein described.

What I do claim is:

1. An improved attachment for the hoes or disks of seed and fertilizer drills, comprising in combination, a bracket projecting rearwardly from a shoe or boot, a tine pivotally mounted on a bolt or pin passing through said bracket, a coil spring fitting over said bolt and having one end exerting a forward pressure on the tine and its opposite end projecting forwardly and resting normally on the bracket, and studs on said bracket for supporting the forwardly projecting end of the spring in different positions, as and for the purposes herein set forth.

2. An improved attachment for the hoes or disks of seed and fertilizer drills, comprising in combination, a bracket projecting rearwardly from a shoe or boot, a tine pivotally mounted on a bolt or pin passing through said bracket, a sleeve on said bolt or pin, a coil spring fitting over said sleeve and having one end bearing against the back of the tine and its opposite end projecting forwardly and resting normally on the bracket, studs on said bracket for supporting the forward end of said spring in different positions, and an abutment member on the bracket for limiting the rearward movement of said tine, as and for the purposes herein set forth.

In witness whereof I have signed this specification in the presence of two witnesses.

RICHARD ALBERT MINTERN.

Witnesses:
A. J. CALLINAN,
JAMES H. ANDERSON.

Copies of this patent may be obtained for five cents each, by addressing the "Commissioner of Patents, Washington, D. C."